(12) United States Patent
Tsuruga et al.

(10) Patent No.: US 10,137,658 B2
(45) Date of Patent: Nov. 27, 2018

(54) VACUUM INSULATOR AND REFRIGERATOR HAVING SAME

(71) Applicant: SAMSUNG ELECTRONICS CO., LTD., Suwon-si, Gyeonggi-do (KR)

(72) Inventors: Toshimitsu Tsuruga, Osaka (JP); Kentaro Kan, Osaka (JP); Kenji Takeuchi, Osaka (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 87 days.

(21) Appl. No.: 15/039,684

(22) PCT Filed: Nov. 25, 2014

(86) PCT No.: PCT/KR2014/011380
§ 371 (c)(1),
(2) Date: May 26, 2016

(87) PCT Pub. No.: WO2015/080449
PCT Pub. Date: Jun. 4, 2015

(65) Prior Publication Data
US 2017/0001405 A1    Jan. 5, 2017

(30) Foreign Application Priority Data

Nov. 26, 2013  (JP) ................................. 2013-243597
Aug. 7, 2014   (JP) ................................. 2014-161432
Nov. 25, 2014  (KR) ....................... 10-2014-0165371

(51) Int. Cl.
*F16L 59/065*    (2006.01)
*B32B 3/04*      (2006.01)
(Continued)

(52) U.S. Cl.
CPC .................. *B32B 3/04* (2013.01); *B32B 5/02* (2013.01); *B32B 5/022* (2013.01); *B32B 5/26* (2013.01);
(Continued)

(58) Field of Classification Search
CPC .... Y10T 428/231; F16L 59/065; E04B 1/803; Y02B 80/12; F25D 2201/14
See application file for complete search history.

(56) References Cited

U.S. PATENT DOCUMENTS 6,998,361 B2    2/2006  Lewis
2001/0023008 A1  9/2001  Offermann et al.
(Continued)

FOREIGN PATENT DOCUMENTS

JP    2009-162267    7/2009
KR  10-2005-0016490   2/2005
(Continued)

OTHER PUBLICATIONS

International Search Report dated Feb. 25, 2015, in corresponding International Patent Application No. PCT/KR2014/011380.
(Continued)

*Primary Examiner* — Alexander S Thomas
(74) *Attorney, Agent, or Firm* — Staas & Halsey LLP

(57) ABSTRACT

Provided is a vacuum insulator having both an excellent insulating performance and an excellent bending strength. A vacuum insulator (1) is configured by a sack-shaped enveloping member (3) and at least one sheet (7) including a plurality of inorganic fibers and includes a core member (5) enclosed in the enveloping member (3). The sheet (7) includes a plurality of bundled inorganic fibers (9) formed by bundling some inorganic fibers from among the plurality of inorganic fibers. At least a part of the bundled inorganic fibers (9) are in contact with each other.

18 Claims, 7 Drawing Sheets

(51) Int. Cl.
- *B32B 5/26* (2006.01)
- *B32B 5/02* (2006.01)
- *F25D 23/06* (2006.01)
- *B32B 7/04* (2006.01)
- *B32B 15/08* (2006.01)
- *B32B 15/085* (2006.01)
- *B32B 15/09* (2006.01)
- *B32B 15/20* (2006.01)
- *B32B 27/08* (2006.01)
- *B32B 27/12* (2006.01)
- *B32B 27/28* (2006.01)
- *B32B 27/32* (2006.01)
- *B32B 27/36* (2006.01)

(52) U.S. Cl.
CPC .............. *B32B 7/045* (2013.01); *B32B 15/08* (2013.01); *B32B 15/085* (2013.01); *B32B 15/09* (2013.01); *B32B 15/20* (2013.01); *B32B 27/08* (2013.01); *B32B 27/12* (2013.01); *B32B 27/281* (2013.01); *B32B 27/32* (2013.01); *B32B 27/36* (2013.01); *F16L 59/065* (2013.01); *F25D 23/062* (2013.01); *B32B 2250/05* (2013.01); *B32B 2250/40* (2013.01); *B32B 2250/44* (2013.01); *B32B 2262/10* (2013.01); *B32B 2262/101* (2013.01); *B32B 2262/105* (2013.01); *B32B 2262/106* (2013.01); *B32B 2262/108* (2013.01); *B32B 2307/304* (2013.01); *B32B 2307/31* (2013.01); *B32B 2307/546* (2013.01); *B32B 2307/7242* (2013.01); *B32B 2509/10* (2013.01); *F25D 23/06* (2013.01); *F25D 2201/14* (2013.01); *Y10T 428/231* (2015.01)

(56) References Cited

U.S. PATENT DOCUMENTS

2004/0092379 A1   5/2004   Lewis
2011/0073604 A1   3/2011   Nomura et al.

FOREIGN PATENT DOCUMENTS

KR      10-0965971          6/2010
KR      10-2011-0015325     2/2011
WO      WO 2009/084367 A1   7/2009

OTHER PUBLICATIONS

Extended European Search Report dated Jul. 20, 2017, in corresponding European Patent Application No. 14866481.6.

VACUUM INSULATOR AND REFRIGERATOR HAVING SAME

CROSS-REFERENCE TO RELATED APPLICATIONS

This application is a U.S. National Stage Application, which claims the benefit under 35 U.S.C. § 371 of PCT International Patent Application No. PCT/KR2014/011380, filed Nov. 25, 2014, which claims the foreign priority benefit of Japanese Patent Application No. 2013-243597, filed Nov. 26, 2013, Japanese Patent Application No. 2014-161432, filed Aug. 7, 2014, and Korean Patent Application No. 10-2014-0165371, filed Nov. 25, 2014, the contents of which are incorporated herein by reference.

TECHNICAL FIELD

The present invention relates to a vacuum insulator and a refrigerator applying the same.

BACKGROUND ART

Because a vacuum insulator has an excellent insulating performance, it is used in various devices for cold reserving and heat reserving. In a conventional vacuum insulator, although glass fibers obtained by a centrifugal method or a flame method are mainly used as a core member, but a continuous filament method having good linearity of fibers and excellent fiber orientation is also used (for example, see Patent document 1). For example, the core member is fabricated by overlapping a plurality of pieces of inorganic non-woven fabric.

In addition, inorganic fibers whose partial fibers are bundled, and a binder component for binding the fibers are also used as composition materials so as to obtain a high-density inorganic non-woven fabric (for example, see Patent document 2).

In addition, there is a base-material non-woven fabric for fiberglass reinforced plastics (FRP), which includes a fiber filament obtained by bundling 100 or more fibers and whose content is 20 weight percent or more, so as to improve shock resistance, and that is obtainable using a binder having a glass transition point of 30° C. or less (for example, see Patent document 3).

PRIOR-ART DOCUMENT

Patent Document

[Patent document 1] Japanese Patent Laid-open Publication No. 2009-162267
[Patent document 2] Japanese Patent Laid-open Publication No. 2004-323992
[Patent document 3] Japanese Patent Laid-open Publication No. hei 10-292254

DISCLOSURE

Technical Problem

However, in a configuration disclosed in Patent document 1, a greater part of inorganic fibers having good linearity extends in a direction almost parallel to a surface of a non-woven fabric and overlaps so that there is less contact between the fibers. Thus, rigidity of the non-woven fabric is lowered, and a bending strength of a vacuum insulator is lowered such that handling may be deteriorated.

In addition, in an inorganic non-woven fabric disclosed in Patent documents 2 and 3, the use of the inorganic non-woven fabric as a vacuum insulator is not considered. Thus, when the inorganic non-woven fabric is used as the vacuum insulator for cold reserving or heat reserving of a device, it is difficult to improve a bending strength without giving up deterioration of an insulating performance The present invention is directed to providing a vacuum insulator having both an excellent insulating performance and an excellent bending strength.

Technical Solution

One aspect of the present invention provides a refrigerator including a vacuum insulator. The vacuum insulator may include: a sack-shaped enveloping member having a gas barrier property; and a core member enclosed in the enveloping member and including one sheet including a plurality of inorganic fibers or a plurality of stacked sheets, and an inside of the enveloping member may be decompressed. The sheet may include a plurality of bundled inorganic fibers formed by bundling some inorganic fibers from among the plurality of inorganic fibers, and at least a part of the bundled inorganic fibers may be in contact with each other.

Advantageous Effects

According to the vacuum insulator proposed in the present specification, an excellent insulating performance and an excellent bending strength can be realized.

MODES OF THE INVENTION

Exemplary embodiments and examples of the present invention will be described with reference to the following drawings.

First Embodiment

—Configuration of Vacuum Insulator—

Figure 1A:
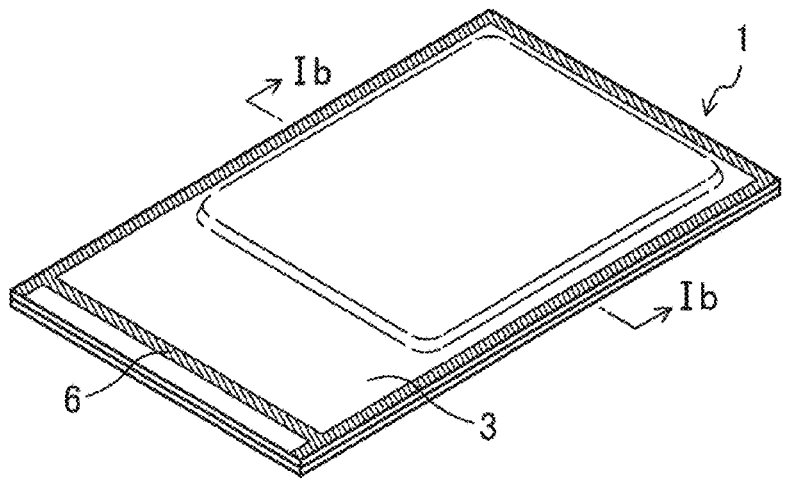
FIG. 1A is a perspective view of a vacuum insulator (1) related to a first embodiment.
Figure 1B:
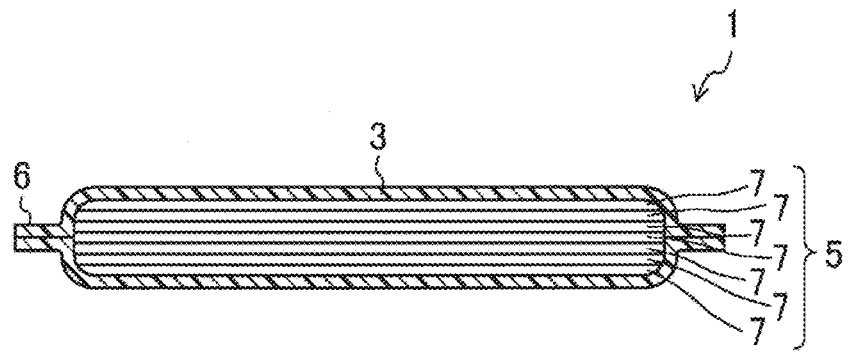
FIG. 1B is a cross-sectional view of the corresponding vacuum insulator (1) taken along line Ib-Ib indicated in FIG. 1A.
Figure 2:
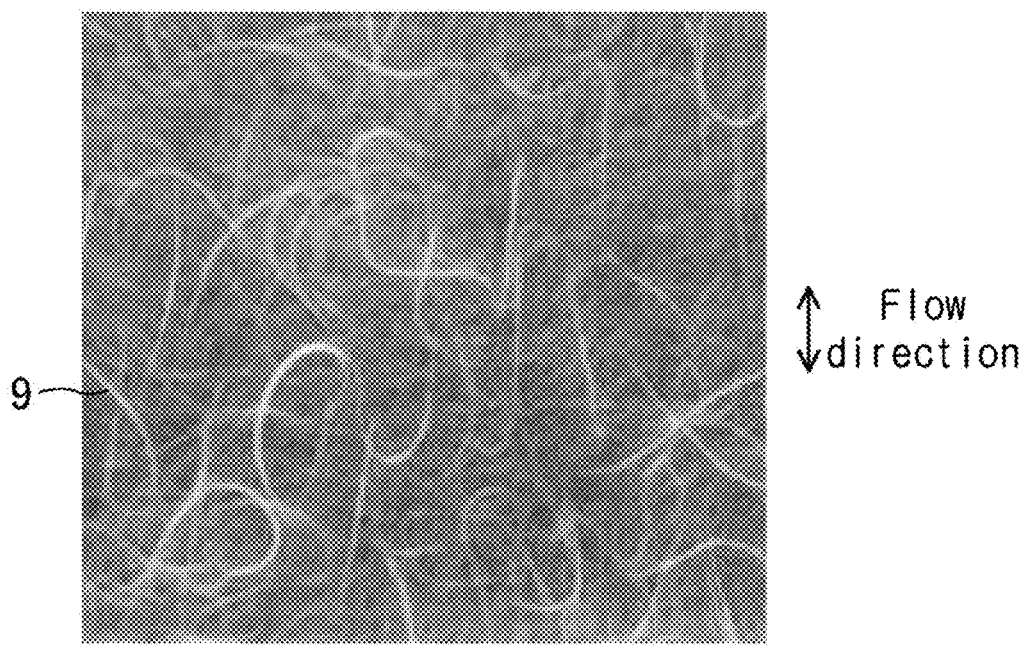
FIG. 2 is a photo showing a surface of a sheet (7) used as a core member (5) of the vacuum insulator (1).

FIG. 1A is a perspective view of a vacuum insulator 1 related to a first embodiment, and FIG. 1B is a cross-sectional view of the corresponding vacuum insulator 1 taken along line Ib-Ib indicated in FIG. 1A. FIG. 2 is a photo showing a surface of a sheet 7 used as a core member 5 of the vacuum insulator 1.

The vacuum insulator 1 according to the current embodiment includes a sack-shaped enveloping member 3 having a gas barrier property and the core member 5 enclosed in the enveloping member 3. An inside of the enveloping member 3 is mostly decompressed and in a vacuum state. The vacuum insulator 1 has a shape of a flat plate, for example, but may be bend-processed. Although not shown, an adsorbent enclosed in a sack having gas permeability may be inserted into the core member 5. When a pin hole, etc. is formed in the enveloping member 3 by inserting the adsorbent into the core member 5, or when external air permeates from a cross-section of the enveloping member 3 as time elapses, the external air may be adsorbed so that a lowering of a degree of vacuum of the vacuum insulator 1 may be suppressed.

In addition, a periphery of ends of the enveloping member 3 includes sealed portions 6 formed by fusing laminate films that constitute the enveloping member 3.

The core member 5 includes one sheet 7 including a plurality of inorganic fibers or a plurality of stacked sheets 7. When an insulating property may be secured, the number of sheets 7 used as the core member 5 may be arbitrary, for example, in the range of approximately 1 to 650 sheets. A thickness of the vacuum insulator 1 may be in the range of approximately 1 to 30 mm, for example, and a thickness of the core member 5 before being decompressed is in the range of approximately 1.5 to 45 mm, for example, but is not limited thereto.

The sheet 7 that is a non-woven fabric including a plurality of inorganic fibers includes a plurality of bundled inorganic fibers 9 formed by bundling some inorganic fibers from among the plurality of inorganic fibers, as illustrated in FIG. 2. A width of each of the bundled inorganic fibers 9 may be in the range of approximately 0.1 to 2.0 mm, a length thereof may be in the range of approximately 10 to 100 mm, and a thickness thereof may be in the range of approximately 0.06 to 0.07 mm. An average width of each of the bundled inorganic fibers 9 may be in the range of approximately 0.2 to 1.1 mm, and an average length of each of the bundled inorganic fibers 9 may be in the range of approximately 20 to 70 mm.

The bundled inorganic fibers 9 are included in the sheet 7 so that a bending strength of the vacuum insulator 1 may be improved compared to a case where no bundled inorganic fibers are included in the sheet 7. Due to the width of each of the bundled inorganic fibers 9 of 0.1 mm or more, the bending strength of the vacuum insulator 1 may be further improved, and due to the width of each of the bundled inorganic fibers 9 of 2.0 mm or less, an insulating performance of the vacuum insulator 1 may be easily secured. In addition, due to the length of each of bundled inorganic fibers 9 of 10 mm or more, the bending strength of the vacuum insulator 1 may be improved, and due to the length of each of the bundled inorganic fibers 9 of 100 mm or less, the insulating performance may be easily secured. However, an effect may be obtained that suppresses a lowering of a strength while maintaining the insulating performance even when the width or the average length of each of the bundled inorganic fibers 9 is out of the above coverage.

In addition, a sheet used as the conventional vacuum insulator does not include bundled inorganic fibers. In the conventional art, when a weight of a sheet per unit area is the same, inorganic fibers are as uniformly distributed as possible so that an insulating performance of the vacuum insulator may be improved. Thus, until now, the sheet including the bundled inorganic fibers has not been used to fabricate the vacuum insulator.

However, the present inventors have ascertained that, as a result of repeatedly conducting independent research, a sheet including bundled inorganic fibers used as a vacuum insulator may maintain a high insulating performance, may improve a mechanical strength, and the vacuum insulator may be made thinner than in the conventional art.

As can be seen in FIG. 2, since the bundled inorganic fibers 9 included in the sheet 7 can be seen by naked eyes, the above-described width and the length of each of the bundled inorganic fibers may be measured using a ruler or vernier calipers, etc. The average width and the average length of each of the bundled inorganic fibers 9 were obtained by cutting the sheet 7 in the form of a rectangle having a size of 290 mm×10 mm, measuring a width and a length of each of 50 bundled inorganic fibers 9 arbitrarily selected from among the plurality of bundled inorganic fibers 9 and averaging the measured widths and lengths.

In addition, more preferably, in the range of approximately 10 to 200 bundled inorganic fibers 9 per 1 $cm^3$ may be included in the sheet 7 before being decompressed. When a ratio of the bundled inorganic fibers 9 with respect to the entire sheet 7 is too low, it is difficult to obtain a sufficient bending strength of the vacuum insulator 1, and when the ratio of the bundled inorganic fibers 9 with respect to the entire sheet 7 is too high, the insulating performance of the vacuum insulator 1 is easily lowered.

It is preferable that an average length of inorganic fibers used as a material for forming the sheet 7 is in the range of 15 to 50 mm such that the above-described bundled inorganic fibers 9 may be easily formed by a wet sheet forming method, which will be described below, and the width and the length of each of the bundled inorganic fibers may be set in a proper range at the same time. It is more preferable that the length of the inorganic fiber is in the range of 15 to 30 mm. In addition, it is preferable that a diameter (an average fiber diameter) of the inorganic fibers is in the range of 3 to 8 μm such that the width and the length of each of the bundled inorganic fibers 9 may be in a more proper range, and an insulating performance may be further improved at the same time. It is more preferable that an average diameter of the inorganic fibers is in the range of 3 to 6 μm.

Here, the length of each of the inorganic fibers is almost the same as a cut length of the inorganic fiber (a cut inorganic fiber) used in a sheet forming process. Thus, by adjusting the length of the cut inorganic fiber, the average length of the inorganic fiber may be set in the above-described range. In addition, the average length may also be adjusted by mixing a plurality of cut inorganic fibers having different lengths.

It is preferable that the average value of weights per unit area of the sheet 7 at room temperature (25° C.) under normal pressure (under 1 atmospheric pressure) before being enclosed in the enveloping member 3 is in the range of 10 $g/m^2$ to 200 $g/m^2$. When the weight per unit area is too large, the thickness of the sheet is increased such that it is difficult to align the inorganic fibers and the bundled inorganic fibers in a plane direction of the sheet 7. Thus, an increase in thermal conduction quantity through the inorganic fibers occurs and thus it is not preferable. When the weight per unit area is small, the thickness of the sheet is decreased such that it is easy to align the orientation of inorganic fibers and the bundled inorganic fibers in the plane direction of the sheet 7 and the thermal conduction quantity may be reduced. In addition, when the weight per unit area is too small, a tensile strength of the sheet 7 is lowered, and handling deterioration or an increase in defects occurs, and the number of stacked layers of the sheet 7 is greatly increased and cost increases at the same time, and thus it is not preferable.

In addition, at least a part of the inorganic fibers from among the sheet 7 enclosed in the enveloping member 3 is not in the form of a complete straight line but has a partially-curved shape. Thus, even though a binder for binding the inorganic fibers does not remain, the inorganic fibers may be in contact with each other such that the shape of the sheet may be maintained Thus, compared to a case where a large amount of the binder exists, the thermal conduction quantity through contact portions between the inorganic fibers may be suppressed to be small In addition, an elongation direction of a contact portion between a part of the plurality of inorganic fibers and other inorganic fibers may have a component in a direction of a thickness of the sheet. Through this configuration, the bending strength of the vacuum insulator 1 may be further improved.

In addition, at least a part of the bundled inorganic fibers 9 may be in contact with each other. Through the current configuration, the bending strength of the vacuum insulator 1 may be further improved. In addition, because the bundled inorganic fibers 9 may be formed by bundling some fibers having a small fiber diameter from among the plurality of fibers to be in contact with each other, for example, when comparing the fibers having the small fiber diameter with fibers having the same fiber diameter as that of the bundled inorganic fibers 9, solid state thermal conductivity is reduced, and an insulating performance may be improved compared to a case where the fibers having the small fiber diameter are mixed with thick fibers having the same fiber diameter as that of the bundled inorganic fibers 9.

Although types of the inorganic fibers used as a material for forming the sheet 7 are not particularly limited, the inorganic fibers may be, for example, one type selected from the group consisting of glass fibers, carbon fibers, ceramic fibers, rock wool, basalt fibers, silica alumina fibers, silica fibers, and alumina fibers, or a mixture of two or more types thereof. When glass fibers are used as the inorganic fibers, it is preferable that the glass fibers are fabricated by a continuous filament method such that it is easy to control a fiber diameter or length to be in a proper range.

It is preferable that a direction having a large tensile strength between a first direction and a second direction perpendicular to the first direction in the plane direction of the sheet 7 is set to be a longitudinal direction of the vacuum insulator 1 because that may improve the bending strength of the vacuum insulator 1. In the direction having the large tensile strength, a ratio at which the inorganic fibers or the bundled inorganic fibers 9 are oriented in the direction, is increased. In addition, in consideration of bending, because a force is applied in the tensile direction outside of a bend with respect to an acting point of force, the tensile strength and the bending strength are generally represented as a correlation. That is, as the tensile strength increases, the bending strength may be improved.

In an example of a method of fabricating the sheet 7 that will be described later, when a flow direction of a sheet forming machine is a first direction and a direction perpendicular to the flow direction is a second direction, if the first direction has a larger tensile strength than the second direction, the first direction may be set to be a longitudinal direction of the vacuum insulator 1. For example, by properly adjusting a flow (a belt) speed or an absorption speed during dehydration, directivity of the inorganic fibers or the bundled inorganic fibers 9 may be changed. Generally, fibers are more easily directed in the flow direction when the flow direction of the fibers is easily set and then the flow speed is increased.

When the inorganic fibers are glass fibers, the glass fibers may include, for example, $SiO_2$ in the range of 50 to 60 weight percent, CaO in the range of 15 to 25 weight percent, MgO in the range of 0 to 6 weight percent, $Al_2O_3$ in the range of 12 to 16 weight percent, $B_2O_3$ in the range of 8 to 13 weight percent, $K_2O$ in the range of 0 to 1 weight percent, and $Na_2O$ in the range of 0 to 1 weight percent (however, the sum of the content of $SiO_2$, CaO, MgO, $Al_2O_3$, $B_2O_3$, $K_2O$, and $Na_2O$ is 100 weight percent or less). The glass fibers may be formed of E glass, for example.

In addition, in order to form the enveloping member 3, for example, a resin film, such as a polyimide film or a polyethyleneterephthalate (PET) film, is used as a surface protection layer, a metal foil formed of aluminum, or a resin film, such as ethylene vinyl alcohol copolymer including a deposited metal, such as aluminum, is used as a gas barrier layer, and a laminate film formed by bonding resin films, such as high-density polyethylene and chain-shaped low-density polyethylene, is used as a thermal fusion layer. However, the composition of the enveloping member 3 is not limited thereto as long as it may be provided with a proper scratch resistance, a proper gas barrier property, and a proper thermal fusion strength. The thickness of the enveloping member 3 is in the range of approximately 60 to 120 μm.

As described above, the vacuum insulator 1 according to the current embodiment has an excellent insulating performance, and a bending strength thereof is increased. Thus, when the vacuum insulator 1 is used as an insulator for a cold reserving or heat reserving device, it is difficult to bend the vacuum insulator 1 by its own weight, and errors do not occur when an adhesive is coated onto the vacuum insulator 1, when a double-sided tape is attached to the vacuum insulator 1, when a release paper is removed from the vacuum insulator 1, when handling such as transportation is performed, or even when the vacuum insulator 1 is attached to an insulated box. In addition, even when the thickness of the vacuum insulator 1 is small, a required insulating performance of the device may be maintained, and handling thereof may be improved. Thus, for example, when the vacuum insulator 1 is used in a refrigerator, space-saving may be attained, and an accommodation capacity may be increased.

—Method of Fabricating Vacuum Insulator—

Figure 3A:
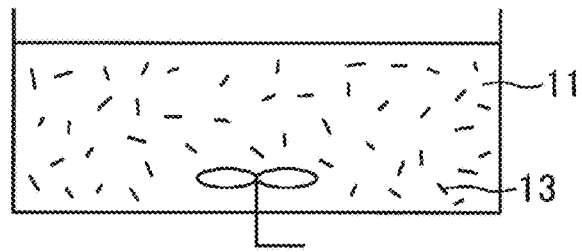
FIGS. 3A, 3B and 3C are views schematically illustrating a sheet forming process for fabricating the sheet (7) used as the core member (5) of the vacuum insulator (1).
Figure 3B:
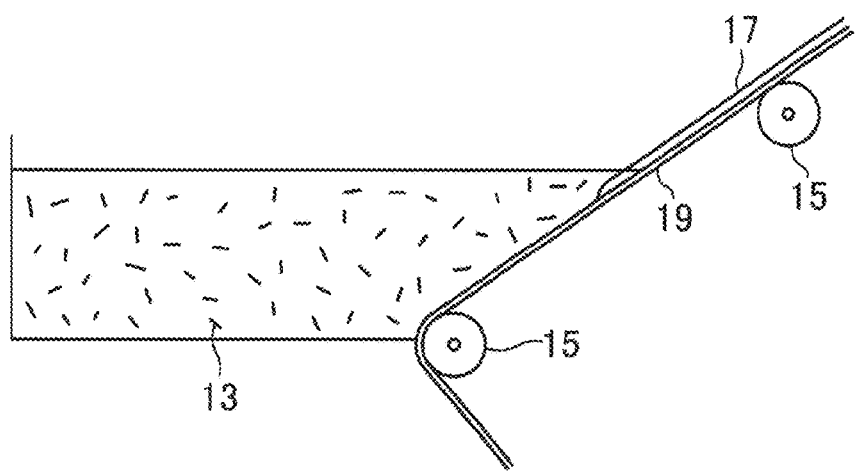
Figure 3C:
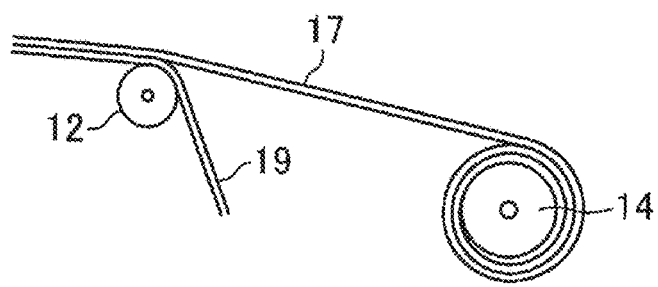
Figure 4A:
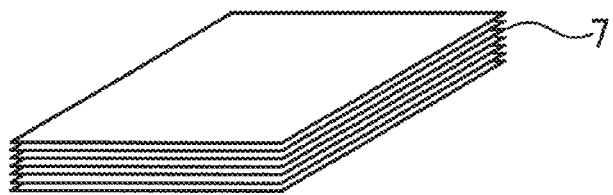
FIGS. 4A, 4B and 4C are views illustrating a method of fabricating the vacuum insulator (1) using the sheet (7).
Figure 4B:
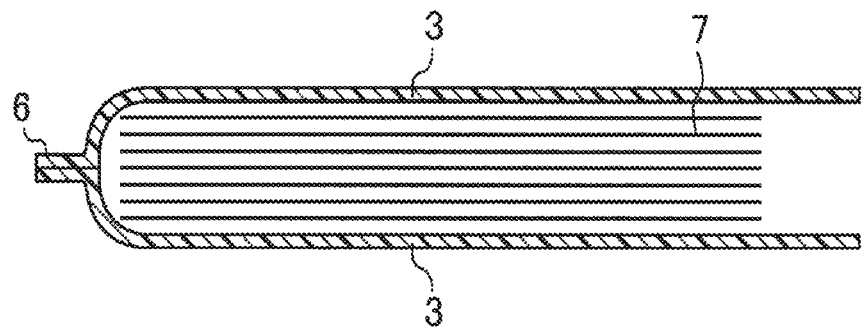
Figure 4C:
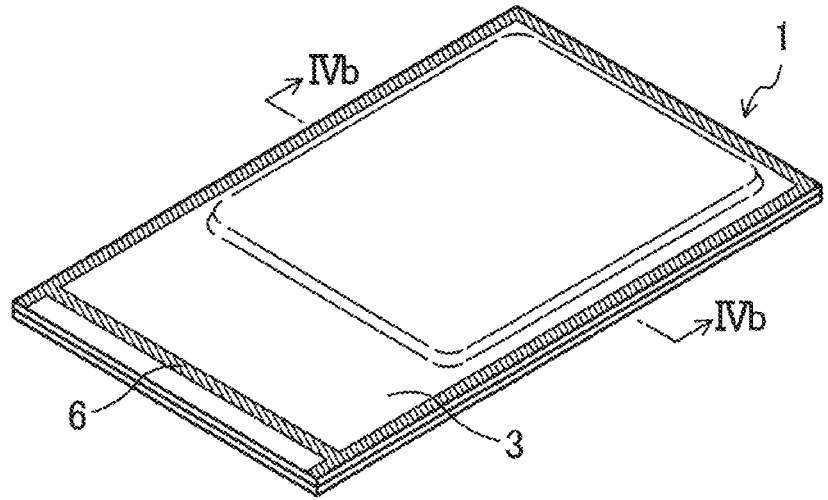

Next, a method of fabricating the vacuum insulator 1 according to the current embodiment will be described. Hereinafter, an example in which glass fibers are used as inorganic fibers, is shown. However, even when ceramic fibers or carbon fibers are used as the inorganic fibers, a vacuum insulator may also be fabricated using the same method. In addition, the following description is an example of the method of fabricating the vacuum insulator 1, and the fabrication method is not limited to the example FIGS. 3A, 3B and 3C are views schematically illustrating a sheet forming process for fabricating the sheet 7 used as the core member 5 of the vacuum insulator 1, and FIGS. 4A, 4B and 4C are views illustrating a method of fabricating the vacuum insulator 1 using the sheet 7. FIGS. 4A and 4C are perspective views, and FIG. 4B is a schematic cross-sectional view of a portion taken along line IVb-IVb of FIG. 4C.

First, in a process illustrated in FIG. 3A, glass fibers having a fiber diameter of 5 μm, for example, are prepared as inorganic fibers. The glass fibers are fabricated by a well-known continuous filament method. Subsequently, the glass fibers are bundled by adding a bundling agent to the glass fibers. Next, the bundled glass fibers are cut to a predetermined length (for example, 25 mm) such that cut glass fibers are fabricated. Here, one selected from the group consisting of a urethane resin, an acetic vinyl resin, an acrylic resin, an epoxy resin, a poly ether-based polymer, a surfactant, a coupling agent, a lubricant, and an anti-static agent, or a plurality thereof is used as the bundling agent.

Next, a dispersion agent and the cut glass fibers are put into a dispersion medium 11, such as water, so that the cut glass fibers in the dispersion medium 11 are dispersed in a state of glass fibers 13. Here, the used dispersion agent is a cationic surfactant, an anionic surfactant, an ampholytic or non-ionic surfactant, or a polymer dispersion agent.

Subsequently, in processes illustrated in FIGS. 3A and 3C, a roll-shaped sheet 17 including the glass fibers 13 is fabricated using a sheet forming machine. In detail, after the sheet 17 including the glass fibers 13 is drawn from the dispersion medium 11 using a belt 19 driven by a roller 15, a proper amount of binder is added into the sheet 7 to fix the glass fibers 13. The sheet 17 is continuously dried and wound up using rollers 12 and 14.

Here, the binder is a polymer compound that combines fibers due to surface tension and is, for example, an acryl resin, a phenol resin, polyvinyl alcohol (PVA) or starch. The binder may include a silane coupling agent.

In addition, an aggregate reagent for aggregating the glass fibers 13 is not used in the above sheet forming process. The aggregate reagent is an agent that includes ions that represent an opposite polarity to the dispersion agent and bundles the glass fibers using an electrostatic force. However, in the fabrication method related to the current embodiment, by properly adjusting a fiber diameter and a fiber length, the glass fibers may be in contact with each other and thus bundled without using the aggregate reagent.

In the above sheet forming process, an average length of the glass fibers 13 is in the range of 15 to 50 mm, for example, and an average diameter of the glass fibers 13 is in the range of 3 to 8 μm, for example, such that bundled inorganic fibers (here, bundled glass fibers) having a proper width and length may be generated in the core member 5 of the vacuum insulator 1.

In addition, the number of bundled glass fibers or the ratio of bundled glass fibers per area may be adjusted by distribution and a degree of error of the fiber diameter and the fiber length of the glass fibers 13. For example, when the ratio of the glass fibers 13 having a large fiber diameter or a small fiber length is increased, the number or ratio of bundled glass fibers is reduced.

In detail, in the case of an average fiber length of the glass fibers 13 being 25 mm, when comparing the number or ratio of bundled glass fibers with respect to the sheet 7 (with a small distribution of the fiber length) including 100% of glass fibers 13 having the fiber length of 25 mm with the number or ratio of bundled glass fibers with respect to the sheet 7 (with a large distribution of the fiber length) including 45% of glass fibers 13 having the fiber length of 25 mm, 40% of the glass fibers 13 have the fiber length of 15 mm and 15% of the glass fibers 13 having the fiber length of 50 mm, the number or ratio of bundled glass fibers of the latter including more of the glass fibers 13 having the small fiber length of 15 mm is reduced.

Thus, by properly adjusting the fiber diameter or the fiber length of the glass fibers 13 and a distribution thereof, generation of bundled glass fibers may be optimized.

Next, in a process illustrated in FIG. 4A, the sheet 17 including the glass fibers is cut to a predetermined size (for example, a width of 290 mm and a length of 410 mm) so that the sheet 7 having a quadrilateral shape, for example, may be fabricated. Subsequently, predetermined pieces (for example, 150 pieces) of sheets 7 overlap and are stacked so that the core member 5 may be fabricated (see FIG. 1B). Also, sheets 7 having large sizes are stacked and then are cut at one time so that the core member 5 may also be fabricated.

Next, the core member 5 is dried using a dry furnace, for example, at a condition of 500° C. for approximately 3 hours. Through this treatment, the binder included in the core member 5 is reduced or destroyed. A drying temperature and a drying time may be properly adjusted according to the type or content of the used binder. Also, by selecting a binder that may be evaporated at a low temperature, the drying temperature may be lowered, and an adhesive force of the binder may be improved to reduce the content so that the drying time is reduced.

Next, in a process illustrated in FIG. 4B, the core member 5 is inserted into the enveloping member 3 together with an adsorbent, for example. Here, an adsorbent that may adsorb moisture and gas may be used, and a material for forming the adsorbent is not especially limited, and for example, a metal oxide, such as calcium oxide, or synthetic zeolite may be used to form the adsorbent.

Subsequently, in a process illustrated in FIG. 4C, the sack-shaped enveloping member 3 in which the core member 5 is enclosed and whose three sides are thermally fused and whose one side is opened, is set in a vacuum chamber, and the vacuum chamber is decompressed (for example, a degree of vacuum of 0.01 Pa) and inside air is discharged, and the opening of the enveloping member 3 is thermally fused and sealed. Thus, the inside of the enveloping member 3 is in a vacuum state. Subsequently, the vacuum insulator 1 is taken out of the vacuum chamber. In this way, the vacuum insulator 1 according to the current embodiment may be fabricated.

Figure 5A:
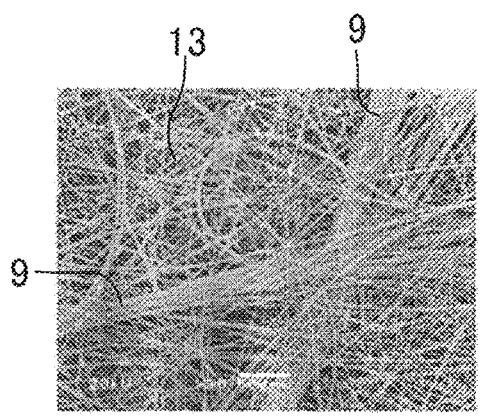
FIGS. 5A and 5B are photos in which a surface and a cross-section of a sheet of a vacuum insulator fabricated by a method according to the first embodiment are respectively photographed using a scanning electron microscope (SEM).
Figure 5B:
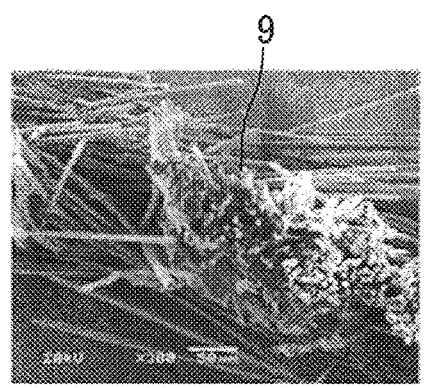

FIGS. 5A and 5B are photos in which a surface (enlarged by 30 times) and a cross-section (enlarged by 300 times) of a sheet of the vacuum insulator 1 fabricated by the method according to the current embodiment are respectively photographed. Also, FIGS. 6A and 6B are photos in which a surface (enlarged by 30 times) and a cross-section (enlarged by 300 times) of a sheet of a vacuum insulator fabricated by a method related to comparative examples are respectively photographed.

Figure 6A:
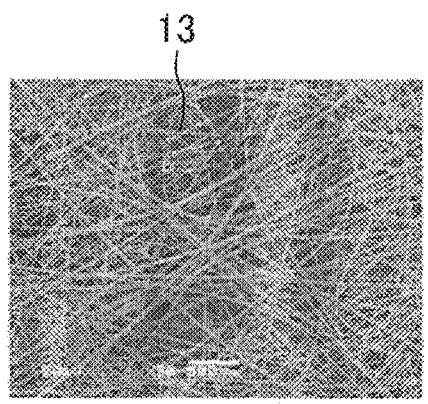
FIGS. 6A and 6B are photos in which a surface and a cross-section of a sheet of a vacuum insulator fabricated by a method related to comparative examples are respectively photographed using a SEM.
Figure 6B:
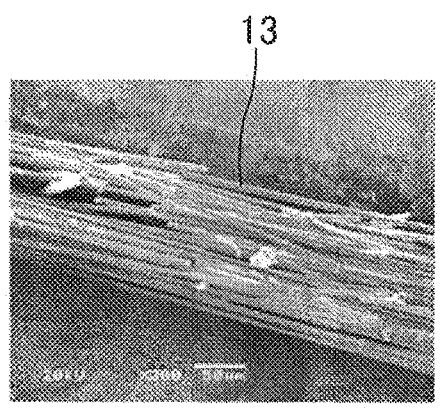

Here, in the vacuum insulator related to the comparative example, linearity of inorganic fibers is comparatively high, and contact between the inorganic fibers is small such that no bundled inorganic fibers are formed (FIGS. 6A and 6B). Unlike this, in the sheet 7 of the vacuum insulator 1 fabricated by the method according to the current embodiment, a part of inorganic fibers are curved, and the number of contact portions between the inorganic fibers is comparatively increased. Also, the bundled inorganic fibers 9 may be seen at the surface of the sheet 7.

The sheet 7 is fabricated by the above-described sheet forming process so that the inorganic fibers and the bundled inorganic fibers may be properly in contact with each other or bridged. Also, by removing or reducing the binder before the core member 5 is enclosed in the enveloping member 3, a lowering of the insulating performance may be suppressed.

As described above, the insulating performance of the vacuum insulator 1 related to the current embodiment is excellent compared to the conventional vacuum insulator, and simultaneously, a bending strength of the vacuum insulator 1 may be improved simply without lowering performance so that handling and productivity may be improved. Also, due to improvements in the bending strength, the vacuum insulator 1 may be fabricated in the form of a thin plate, and an insulating wall may be fabricated in the form of a thin wall so that improvements in an accommodation capacity of an insulated box or a refrigerator applying the vacuum insulator 1 may be achieved.

Second Embodiment

Figure 7:
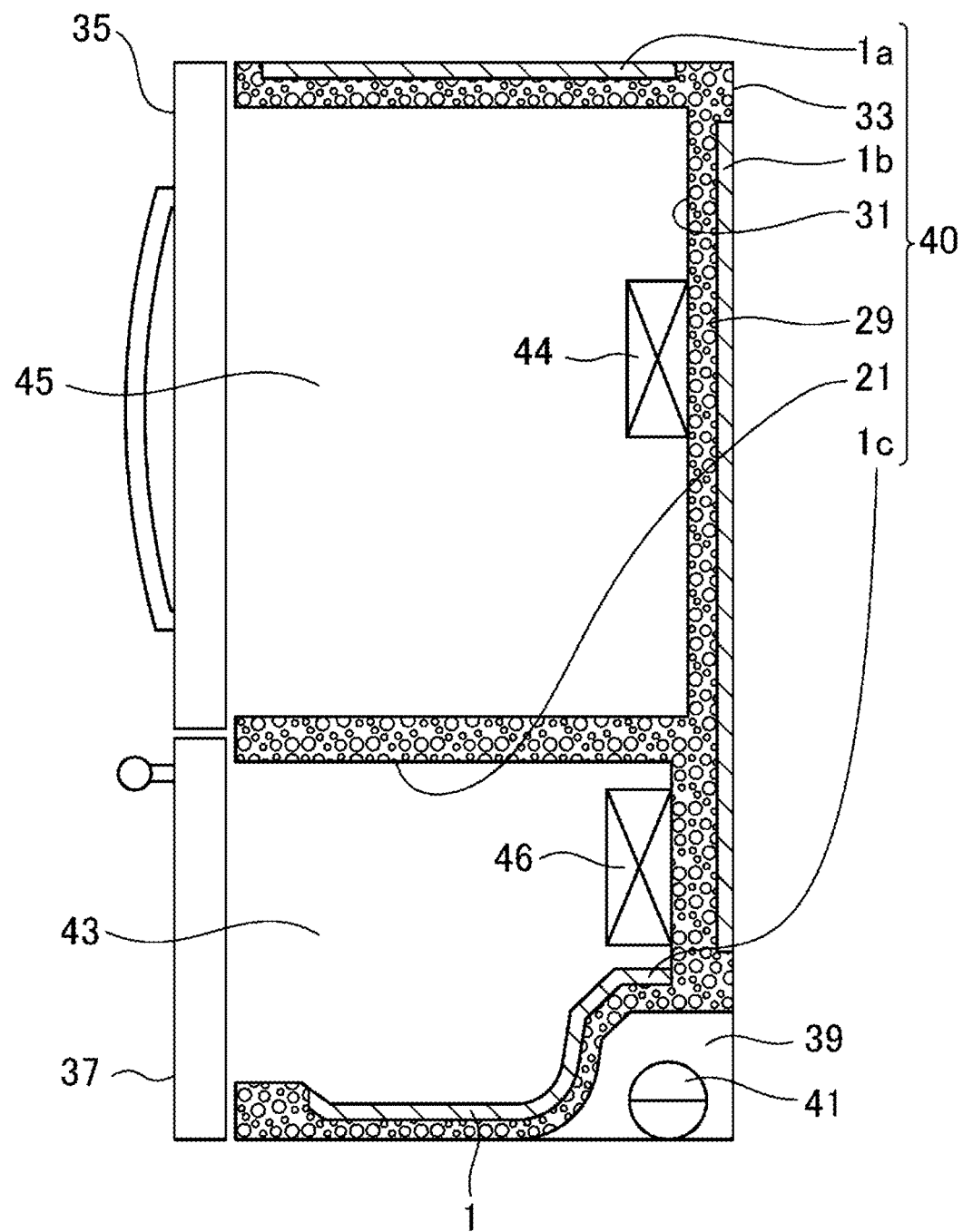
FIG. 7 is a cross-sectional view showing a refrigerator related to a second embodiment.

A refrigerator using the vacuum insulator 1 related to the first embodiment according to a second embodiment of the present invention will be described. FIG. 7 is a cross-sectional view of the refrigerator related to the current embodiment.

As illustrated in the same drawing, the refrigerator according to the current embodiment includes an outer case 33, inner cases 21 and 31 that are accommodated in the outer case 33 and respectively form storage compartments therein, and vacuum insulators 1a, 1b, and 1c disposed between the outer case 22 and the inner cases 21 and 31. Here, the vacuum insulators 1a, 1b, and 1c, which are respectively disposed on a ceiling surface, a rear surface, and a bottom surface of the refrigerator, have the same configuration as that of the vacuum insulator 1 related to the first embodiment. The vacuum insulator may have a flat plate shape like the vacuum insulators 1b and 1c and may be installed to be properly bent according to a shape of a portion to be used, like the vacuum insulator 1c.

Both the inner cases 21 and 31 and the outer case 33 have openings formed in a forward direction. In an example of FIG. 7, a storage compartment in the inner case 21 is a freezer compartment 43 set at a freezing temperature, and a storage compartment in the inner case 31 is a refrigerator compartment 45 set at a refrigerating temperature.

The inner cases 21 and 31, the outer case 33, the vacuum insulators 1a, 1b, and 1c, a drawer type door 37 that closes an opening of the inner case 21, a rotational door 35 that closes the opening of the inner case 31, and a foam (a rigid) urethane 29 constitute an insulated box 40. The outer case 33 is exposed to the outside except for a part thereof, and a front end of the outer case 33 is connected to the inner cases 21 and 31. Also, although not shown, a vacuum insulator is disposed between the inner case 31 and the outer case 33 at both sides of the refrigerator.

In addition, the refrigerator according to the current embodiment includes a refrigerating cycle including a compressor 41 and a condenser, electric boards, and electric wires in addition to the insulated box 40 (includes not-shown elements). A part of a refrigerant pipe in the refrigerating cycle, a part of the electric wires, and the vacuum insulators 1a, 1b, and 1c are respectively installed in proper places of a space that is a wall between the outer case 33 and the inner cases 21 and 31, and an insulator, such as the foam urethane 29 or a foam polystyrene, is filled in the remaining places of the space. Thickness of each material or base material is not specifically limited, and for example, the outer case 33 may be formed of iron or stainless steel, the inner cases 21 and 31 may be formed of acrylonitrile butadiene styrene copolymer (ABS), the refrigerant pipe may be formed of copper or aluminum, and a refrigerant may be R134a or R600a.

The refrigerator according to the current embodiment may include a storage compartment set at an arbitrary temperature except for the refrigerator compartment 45 and the freezer compartment 43. Each storage compartment is divided into partitions having a proper insulating property.

In addition, the rotational door 35 and the drawer type door 37 is installed at the front of each storage compartment. A packing for sealing the refrigerator is mounted on a door, and the door has a proper insulating property so as to suppress heat leakage and to prevent dew condensation. Because a container that accommodates food is mounted in the drawer type door 37, an accommodation container emerges when the door is drawn. A door portion of each interior has a door pocket that may accommodate food and a shelf or tray that divides the interior is installed at the door portion of each interior. In addition, an ice making machine may be installed in the refrigerator, or an ice dispenser may be disposed in the front of the refrigerator.

Since the refrigerating cycle includes the compressor 41, the condenser, evaporators 44 and 46, a capillary tube, a drier and a pressure accumulator, they are combined in the form of a pipe and constitute a cycle. Basically, the refrigerant circulates in the order of the compressor 41, the condenser, the capillary tube, and the evaporators 44 and 46, and is restored to the compressor 41 from the evaporators 44 and 46. In addition, the drier is mounted in front of the capillary tube so as to remove moisture and to induce blockage prevention, and the pressure accumulator is mounted between the evaporators 44 and 46 and the compressor 41 so that the refrigerant in a liquid state does not flow into the compressor 41.

The compressor 41 and the condenser are installed in a machine compartment 39 together with a fan for promoting heat dissipation, and the evaporators 44 and 46 are installed at proper positions of the rear surface of the refrigerator. The capillary tube is installed in the machine compartment 39 but may also be buried in the foam urethane 29. Also, a heat dissipation pipe for further dissipating heat of the refrigerant is connected between the condenser and the capillary tube. The heat dissipation pipe is installed in contact with an inner surface of the outer case 33 of the refrigerator or an inside of a front portion of a partition so as to perform heat dissipation in outer air. An installation method is not particularly limited, but the heat dissipation pipe is attached to and fixed to the inner surface of the outer case 33 of the refrigerator or the inside of the front portion of a partition using an aluminum tape so as to promote heat dissipation. A length or shape of the heat dissipation pipe may contribute to sufficient heat dissipation of the refrigerant.

A fan (an air blower) is installed at an upper portion of each of the evaporators 44 and 46, and by cooled air being circulated by the evaporators 44 and 46, the inside of the refrigerator is cooled. A room in which the evaporators 44 and 46 are installed may be connected to another room by a duct. Also, the duct may be opened and closed by a damper so that an inside temperature of the refrigerator may be controlled.

The number of the evaporators 44 and 46 is not particularly limited. However, in consideration of an energy-saving performance (a low power consumption quantity) and cost and content efficiency, a total number of evaporators may be 2, i.e., one evaporator at the freezer compartment 43 and one evaporator at the refrigerator compartment 45, as shown in the example of FIG. 7. This may be realized when a valve is attached in the refrigerating cycle and the refrigerant is diverged. Also, the size of an evaporator, the number and shape of pins, and a length of a pipe that may set the inside at a target temperature are not particularly limited.

Also, an injection hole that is a hole for injecting urethane into the bottom surface or the rear surface is installed at the refrigerator, and a hole for gas discharge when urethane foams is installed at proper places of the inner cases 21 and 31. The number and size of injection holes and holes for gas discharge is not particularly limited. However, for example, when four injection holes are provided at four places of the rear surface of the refrigerator such that a urethane may foam, because a charging property is good and the density of the urethane is easily made uniform, quality improvement is possible.

In addition, a lighting device is mounted at an upper portion of the inside of the refrigerator. The type of lighting is not particularly limited, and a fluorescent lamp or a light emitting diode (LED) lamp may be used as the lighting device. In addition, the color of the lighting device may be white, blue, or orange so that an inside of the refrigerator may be seen.

As a method of installing the vacuum insulators 1a, 1b, and 1c in the refrigerator, the vacuum insulators 1a, 1b, and 1c are attached to an inner surface of the outer case 33 or outer surfaces of the inner cases 21 and 31, or are installed between the outer case 33 and the inner case 21 without being attached to the outer case 33 and the inner cases 21 and 31, or a combination of these methods is used. An attachment unit may be an adhesive, such as a double-sided tape or a hot melt, or a sticking agent. Also, a method of coating the hot melt includes beading, roll coating, bar coating, and spiraling. However, a unit that has a sufficient adhesive force and is suitable for a work and a process may be properly selected.

Because the refrigerator according to the current embodiment includes the vacuum insulators 1a, 1b, and 1c having an excellent insulating performance, as described in the first embodiment, the thickness of the vacuum insulator is made the same as that of the conventional vacuum insulator so that cooling efficiency may be improved. Also, since the bending strength of the vacuum insulator is increased, it is difficult to bend the vacuum insulator by its own weight, and handling during fabrication or transportation is improved so that quality improvement or defect reduction may be attained.

Also, even when the vacuum insulators 1a, 1b, and 1c are made thin, they have good handling in comparison to the conventional vacuum insulator so that an accommodation capacity of the refrigerator may be increased without lowering a cooling performance. Recently, needs for increasing the accommodation capacity without increasing external dimensions of the refrigerator are getting stronger so that the effects of using the vacuum insulators 1a, 1b, and 1c are very large.

Also, the vacuum insulators related to the above-described embodiments, the fabrication method thereof, and the refrigerator are examples of the embodiments, and the size, shape, material, and fabrication condition of each element may be properly changed without departing from the spirit of the present invention.

In addition, the configuration of the insulated box 40 included in the refrigerator may be applied to various devices that require an insulating property, such as a water heater, a microwave oven, a bathtub, and a beverage vending machine, in addition to the refrigerator.

EXAMPLE

Vacuum insulators having the following configurations were fabricated as examples and comparative examples of the vacuum insulator 1 related to the first embodiment to measure thermal conductivity and bending strength.

—Fabrication of Vacuum Insulator—

Example 1

A vacuum insulator was fabricated according to the method of fabricating a vacuum insulator related to the above-described first embodiment.

In detail, glass fibers fabricated by a continuous filament method were used as inorganic fibers. E glass was used as a composition material of the glass fibers.

By the above-described sheet forming process, a sheet including bundled glass fibers was fabricated. A tensile strength of the sheet was measured, and the tensile strength of the sheet in a lengthwise direction, i.e., a longitudinal direction was 3.6 times with respect to that in a widthwise direction. Even in other examples and comparative examples, the tensile strength of the sheet in the lengthwise direction was increased with respect to that in the widthwise direction. 150 stacked sheets were used as a core member, and the core member was enclosed in an enveloping member in a vacuum state together with an adsorbent so that the vacuum insulator was fabricated. The thickness of the vacuum insulator was 7 mm The sheet used as the vacuum insulator was observed by an electron microscope. As illustrated in FIGS. 5A and 5B, some bundled glass fibers and inorganic fibers were in contact with each other.

The average weight of the sheet used as the core member per unit area was 13 g/m$^2$, the average fiber diameter of glass fibers of the sheet was 5.5 μm, and the average fiber length of the glass fibers was 20 mm, as shown in Tables 1 and 2. Also, the average width of the bundled inorganic fibers (the bundled glass fibers) was 0.71 mm, and the average length of the bundled glass fibers was 46 mm. The number of bundled glass fibers of the sheet per unit area was 5,510/m$^2$, and when converting the number of bundled glass fibers into the number of bundled glass fibers per unit volume by being divided by the thickness of the sheet at room temperature (25° C.) under normal pressure (1 atmospheric pressure), the number of bundled glass fibers was 92 per 1 cm$^3$.

A laminate film formed by dry laminating a polyimide film having a thickness of 25 μm, a polyethylene terephthalate film having a thickness of 12 μm, an aluminum foil having a thickness of 6.5 μm, and a high-density polyethylene film having a thickness of 50 μm and bonding them was used as the enveloping member. Approximately 5 g of adsorbent, whose main component was calcium oxide, was used.

The thermal conductivity and bending strength of the vacuum insulator fabricated in this way were measured. The result of the measurement is shown in Tables 1 and 2.

Example 2

A vacuum insulator was fabricated using the same method as that of example 1. The average fiber length of glass fibers included in a sheet used as a core member was 25 mm, the average width of bundled glass fibers was 0.56 mm, and the average length of the bundled glass fibers was 44 mm. The number of bundled glass fibers of the sheet per unit area was 2,820/m$^2$. A tensile strength ratio of a widthwise tensile strength with respect to a lengthwise tensile strength of the sheet was 3.9.

The thermal conductivity and bending strength of the vacuum insulator fabricated in this way were measured.

Example 3

A vacuum insulator was fabricated using the same method as that of example 1. The average fiber length of glass fibers included in a sheet used as a core member was 25 mm, the average width of bundled glass fibers was 0.56 mm, and the average length of the bundled glass fibers was 44 mm. Also, the average weight of the sheet per unit area was 25 g/m$^2$, and the number of stacked layers of the sheet used as the core member was 74. The number of bundled glass fibers of the sheet per unit area was 5,870/m$^2$. A tensile strength ratio of a widthwise tensile strength with respect to a lengthwise tensile strength of the sheet was 3.9.

The thermal conductivity and bending strength of the vacuum insulator fabricated in this way were measured.

Example 4

A vacuum insulator was fabricated using the same method as that of example 1. The average fiber length of glass fibers included in a sheet used as a core member was 25 mm, and the average width of bundled glass fibers was 0.76 mm, and the average length of the bundled glass fibers was 47 mm. Also, the average weight of the sheet per unit area was 40 g/m$^2$, and the number of stacked layers of the sheet used as the core member was 42. The number of bundled glass fibers of the sheet per unit area was 6,890/m$^2$. A tensile strength ratio of a widthwise tensile strength with respect to a lengthwise tensile strength of the sheet was 3.8.

The thermal conductivity and bending strength of the vacuum insulator fabricated in this way were measured.

Also, in the sheet used as the vacuum insulator related to examples 1 to 4, bundled inorganic fibers were in contact with each other.

Comparative Example 1

By collecting (a dry method) glass fibers fabricated by a centrifugation method, adding a proper amount of binder to the glass fibers and then heating, pressing and compression-forming the glass fibers using a press machine, a sheet including the glass fibers was fabricated. No bundled glass fibers were generated in the sheet when the sheet was fabricated. The average fiber diameter of the glass fibers that constitute the fabricated sheet was 5 μm, and the average fiber length thereof could not be measured. The average weight of the sheet per unit area was 1860 g/m$^2$, and the number of stacked layers of the sheet used as the core member was 1.

A vacuum insulator was fabricated using the sheet through the same method as that of example 1.

The thermal conductivity and bending strength of the vacuum insulator fabricated in this way were measured. The configuration of an enveloping member, an adsorbent, and the size and thickness of the vacuum insulator were the same as those of the vacuum insulator of example 1. The thermal conductivity and bending strength of the vacuum insulator were measured.

Comparative Example 2

A sheet forming process was performed using glass fibers fabricated by a continuous filament method so that a sheet including the glass fibers was fabricated. In the glass fibers having a fiber diameter and a fiber length used in comparative example 2, no bundled glass fibers were generated in the sheet. Also, the above-described aggregate reagent was not used.

The average fiber length of the glass fibers included in the sheet used as a core member was 5 mm, and the average fiber diameter thereof was 4.6 μm. Also, the average weight of the sheet per unit area was 9 g/m$^2$, and the number of stacked layers of the sheet used as the core member was 180. A tensile strength ratio of a widthwise tensile strength with respect to a lengthwise tensile strength of the sheet was 2.3.

The thermal conductivity and bending strength of the vacuum insulator fabricated in this way were measured.

Comparative Example 3

A sheet forming process was performed using glass fibers fabricated by a continuous filament method so that a sheet including the glass fibers was fabricated. In the glass fibers having a fiber diameter and a fiber length used in comparative example 3, no bundled glass fibers were generated in the sheet when the sheet was fabricated.

The average fiber length of the glass fibers included in the sheet used as a core member was 10 mm, and the average fiber diameter thereof was 5.5 μm. Also, the average weight of the sheet per unit area was 10 g/m$^2$, and the number of stacked layers of the sheet used as the core member was 180. A tensile strength ratio of a widthwise tensile strength with respect to a lengthwise tensile strength of the sheet was 3.6.

The thermal conductivity and bending strength of the vacuum insulator fabricated in this way were measured.

Comparative Example 4

A sheet forming process was performed using glass fibers fabricated by a continuous filament method so that a sheet including the glass fibers was fabricated. In the glass fibers having a fiber diameter and a fiber length used in comparative example 4, no bundled glass fibers were generated in the sheet when the sheet was fabricated. Also, the above-described aggregate reagent was not used.

The average fiber length of the glass fibers included in the sheet used as a core member was 13 mm, and the average fiber diameter thereof was 13 μm. Also, the average weight of the sheet per unit area was 50 g/m$^2$, and the number of stacked layers of the sheet used as the core member was 36. A tensile strength ratio of a widthwise tensile strength and a lengthwise tensile strength of the sheet was 2.4.

The thermal conductivity and bending strength of the vacuum insulator fabricated in this way were measured.

Comparative Example 5

A vacuum insulator was fabricated using the same method as that of example 1. The average fiber length of glass fibers included in a sheet used as a core member was 6 mm, the average width of bundled glass fibers was 0.54 mm, and the average length of the bundled glass fibers was 12 mm No contact with the bundled glass fibers could be seen. Also, the average weight of the sheet per unit area was 130 g/m$^2$, and the number of stacked layers of the sheet used as a core member was 15. The number of bundled glass fibers of one sheet per area was 2,500/m$^2$. A tensile strength ratio of a widthwise tensile strength with respect to a lengthwise tensile strength of the sheet was 1.1.

The thermal conductivity and bending strength of the vacuum insulator fabricated in this way were measured.

Also, in the sheet used as the vacuum insulator related to comparative example 5, bundled inorganic fibers were not in contact with each other.

—Measuring Method—

<Measurement of Base Fibers (Glass Fibers) Having Average Fiber Diameter and Average Fiber Length>

A portion having a quadrilateral shape of 5 mm×5 mm was cut from a core member after being enclosed in an enveloping member, and the cut core member was observed by being enlarged by 1,500 times using a scanning electron microscope (SEM). An average value of fiber diameters measured by arbitrarily selecting 50 glass fibers was obtained. Also, 50 glass fibers were arbitrarily selected from an arbitrarily-selected core member in the range of 290 mm×10 mm, and the fiber length of the selected glass fibers was measured by a measurement using a microscope, a magnifying glass, or vernier calipers by the naked eye, and an average value of the fiber lengths was obtained.

<Measurement of Bundled Glass Fibers>

After the number of bundled glass fibers included in the range of 290 mm×10 mm arbitrarily selected from a sheet was counted to be seen by the naked eye, the number of sheets per unit area and the number of sheets per unit volume were calculated. Also, in a state in which 50 bundled glass fibers were arbitrarily selected from the bundled glass fibers included in the above range of the sheet, the 50 bundled glass fibers were cut, were extended straight and fixed, and lengths and widths thereof were measured using vernier calipers or a ruler so as to obtain an average value of the lengths and widths.

<Measurement of Tensile Strength>

A tension test was conducted using a sheet having a size of 50 mm (width)×300 mm (length). The test was conducted based on conditions stipulated in standard article 6.3.1 according to JIS L 1913:2010. A length of a specimen between grips was 200 mm, a test temperature was 23° C., a test humidity was 50%, and a tensile speed was 10 mm/min <Measurement of Thermal Conductivity (Insulating Performance)>

Measurement of thermal conductivity of a vacuum insulator was conducted when the size of the vacuum insulator was a width of 290 mm, a length of 410 mm and a thickness of 7 mm. The measurement was conducted using product HFM436 by NETZSCH company as a measurement device based on JIS A1412-2 (a heat flow meter). A test condition was a high temperature of 38° C. and a low temperature of 10° C. (ΔT=28K). Also, the measurement was conducted after 24 hours elapsed after the vacuum insulator was fabricated. Tables 1 and 2 show average values of the result of the measurement for three examples.

<Measurement of Bending Strength>

A three-point bending test was conducted when the size of a vacuum insulator was a width of 30 mm, a length of 120 mm and a thickness of 7 mm A test condition was conducted based on JIS K7221-2:2006. A radius of an indenter and a support was 15 R, and a distance between points was 88 mm, and after a specimen was conserved at 23° C. and a humidity of 50% for 88 hours or more, it was provided for a test (based on JIS K7100:1999). A test temperature was 23° C., a test humidity was 50%, and a bending speed was 20 mm/min. Also, in a bending strength, a force at a yielding point was calculated as the maximum. This is based on a concept that, when a folded portion occurs in the vacuum insulator (a yielding point), bending is very easily performed based on the folded portion.

TABLE 1

| Core member | | | Example 1 | Example 2 | Example 3 | Example 4 |
|---|---|---|---|---|---|---|
| | Fiber fabrication method | | Continuous filament method | Continuous filament method | Continuous filament method | Continuous filament method |
| | Average fiber diameter | [μm] | 5.5 | 5.5 | 5.5 | 7.5 |
| | Average fiber length | [mm] | 20 | 25 | 25 | 25 |
| | Average weight of sheet per unit area | [g/m²] | 13 | 12 | 25 | 40 |
| | Sheet thickness | [mm] | 0.06 | 0.07 | 0.14 | 0.23 |
| | Number of stacked layers of sheet | [sheet] | 150 | 150 | 74 | 42 |
| | Tensile strength ratio of widthwise tensile strength with respect to lengthwise tensile strength of sheet | — | 3.6 | 3.9 | 3.9 | 3.8 |
| | Existence of bundled inorganic fibers | — | Existence | Existence | Existence | Existence |
| | Whether bundled inorganic fibers are in | — | Contact | Contact | Contact | Contact |

TABLE 1-continued

|  |  | Example 1 | Example 2 | Example 3 | Example 4 |
|---|---|---|---|---|---|
| contact with each other |  |  |  |  |  |
| Average width of bundled inorganic fibers | [mm] | 0.71 | 0.56 | 0.56 | 0.76 |
| Average length of bundled inorganic fibers | [mm] | 46 | 44 | 44 | 47 |
| The number of bundled inorganic fibers of one sheet per area | [piece/m$^2$] | 5510 | 2820 | 5870 | 6890 |
| The number of bundled inorganic fibers of one sheet per volume | [piece/m$^2$] | 92 | 40 | 42 | 30 |
| Ratio of bundled inorganic fibers per one sheet (volume ratio) | [%] | 18.0 | 6.9 | 7.2 | 7.5 |
| Enveloping member |  | ONY(25)/PET(12)/AL(6.5)/HDPE(50) | | | |
| Adsorbent |  | Calcium oxide | | | |
| Degree of vacuum of vacuum chamber | [Pa] | 0.01 | | | |
| Size of vacuum insulator | [mm] | W290 × L410 | | | |
| Thickness of vacuum insulator | [mm] | 7 | | | |
| Heat transfer rate (n = 3) | [W/(m · K)] × 10$^{-3}$ | 1.25 | 1.17 | 1.23 | 1.34 |
| Bending strength ※(n = 3) | [MPa] | 1.26 | 1.14 | 1.22 | 1.23 |

TABLE 2

|  |  |  | Comparative example 1 | Comparative example 2 | Comparative example 3 | Comparative example 4 | Comparative example 5 |
|---|---|---|---|---|---|---|---|
| Core member | Fiber fabrication method |  | Continuous filament method | Continuous filament method | Continuous filament method | Continuous filament method | Continuous filament method |
|  | Average fiber diameter | [μm] | 5 | 4.6 | 5.5 | 13 | 5.8 |
|  | Average fiber length | [mm] | — | 5 | 10 | 13 | 6 |
|  | Average weight of sheet per unit area | [g/m$^2$] | 1860 | 9 | 10 | 50 | 130 |
|  | Sheet thickness | [mm] | 32 | 0.06 | 0.06 | 0.30 | 0.56 |
|  | Number of stacked layers of sheet | [sheet] | 1 | 180 | 180 | 36 | 15 |
|  | Tensile strength ratio of widthwise tensile strength with respect to lengthwise tensile strength of sheet | — | — | 2.3 | 3.6 | 2.4 | 1.1 |

TABLE 2-continued

|  |  | Comparative example 1 | Comparative example 2 | Comparative example 3 | Comparative example 4 | Comparative example 5 |
|---|---|---|---|---|---|---|
| Existence of bundled inorganic fibers | — | None | None | None | None | Existence |
| Whether bundled inorganic fibers are in contact with each other | — | — | — | — | — | Non-contact |
| Average width of bundled inorganic fibers | [mm] | — | — | — | — | 0.54 |
| Average length of bundled inorganic fibers | [mm] | — | — | — | — | 12 |
| The number of bundled inorganic fibers of one sheet per area | [piece/m$^2$] | 0 | 0 | 0 | 0 | 2500 |
| The number of bundled inorganic fibers of one sheet per volume | [piece/m$^2$] | 0 | 0 | 0 | 0 | 4 |
| Ratio of bundled inorganic fibers per one sheet (volume ratio) | [%] | 0 | 0 | 0 | 0 | 0.2 |
| Enveloping member |  | ONY(25)/PET(12)/AL(6.5)/HDPE(50) | | | | |
| Adsorbent |  | Calcium oxide | | | | |
| Degree of vacuum of vacuum chamber | [Pa] | 0.01 | | | | |
| Size of vacuum insulator | [mm] | W290 × L410 | | | | |
| Thickness of vacuum insulator | [mm] | 7 | | | | |
| Heat transfer rate (n = 3) | [W/(m · K)] × 10$^{-3}$ | 2.28 | 1.16 | 1.16 | 1.97 | 1.31 |
| Bending strength ※(n = 3) | [MPa] | 1.03 | 1.00 | 1.06 | 1.02 | 1.02 |

※In bending strength, a force at a yielding point was calculated as the maximum.

—Measurement Result—

As shown in Tables 1 and 2, a heat transfer rate of the vacuum insulator related to the current examples 1 to 4 was in the range of 1.17 W/(m·K)×10$^{-3}$ to 1.34 W/(m·K)×10$^{-3}$, and the vacuum insulator related to examples 1 to 4 had a good insulating performance compared to the vacuum insulator of comparative examples 1 and 4. In detail, the heat transfer rate of the vacuum insulator related to the current examples 1 to 4 had a good insulating performance improved by in the range of 41% to 49% compared to the vacuum insulator of comparative example 1.

Also, a bending strength of the vacuum insulator related to examples 1 to 4 was certainly larger than that of the vacuum insulator related to comparative examples 1 to 5. In detail, the bending strength of the vacuum insulator related to the current examples 1 to 4 was improved by in the range of 11% to 22% compared to the vacuum insulator of comparative example 1.

This may be considered by the lack of inclusion of bundled glass fibers in the sheet in the vacuum insulator of comparative examples 1 to 4. In comparative example 1, orientation was not good such that thermal conductivity was large, and there was less fiber contact such that a bending strength was also weak. In comparative example 2, orientation was good such that thermal conductivity was small, but there was less fiber contact such that a bending strength was also weak. In comparative example 4, orientation was good, fibers were thick, and a contact area was large such that thermal conductivity was larger than in the current examples 1 to 4 and a bending strength was small.

Also, it may be considered that a bending strength of the vacuum insulator of comparative example 5 was smaller than that of the vacuum insulator related to examples 1 to 4 because the ratio of bundled inorganic fibers with respect to the entire sheet was low and the bundled inorganic fibers were not in contact with each other.

As described above, in the vacuum insulator according to the current embodiments, bundled glass fibers are included in the sheet so that both thermal conductivity and a bending strength can be improved in comparison to the conventional vacuum insulator.

While the invention has been shown and described with reference to certain exemplary embodiments thereof, it should be understood by those skilled in the art that various changes in form and details may be made therein without departing from the spirit and scope of the invention as defined by the appended claims.

INDUSTRIAL APPLICABILITY

As described above, a vacuum insulator related to examples of the present invention can be applied to various devices that require an insulating property, such as an insulated box, a refrigerator, a water heater, a microwave oven, a bathtub, and a beverage vending machine.

The invention claimed is:

1. A refrigerator comprising:
an outer case;
an inner case accommodated in the outer case;
a refrigerating cycle; and
a vacuum insulator disposed between the outer case and the inner case,
wherein the vacuum insulator comprises:
   a sack-shaped enveloping member having a gas barrier property; and
   a core member enclosed in the enveloping member, the core member including one or more sheets, each including a plurality of inorganic fibers,
   an inside of the enveloping member is decompressed, and
   at least one sheet of the one or more sheets comprises a plurality of bundled inorganic fibers formed by bundling some inorganic fibers from among the plurality of inorganic fibers, and at least a part of the bundled inorganic fibers are in contact with each other,
   wherein the at least one sheet comprises in the range of 10 to 200 bundled inorganic fibers per 1 cm3.

2. The refrigerator of claim 1, wherein the core member comprises an adsorbent enclosed in a sack having gas permeability.

3. The refrigerator of claim 1, wherein a periphery of each end of the enveloping member comprises sealed portions formed by fusing laminate films that constitute the enveloping member.

4. The refrigerator of claim 1, wherein a width of each of the bundled inorganic fibers is in the range of 0.1 to 2.0 mm, and a length of each of the bundled inorganic fibers is in the range of 10 to 100 mm.

5. The refrigerator of claim 1, wherein at least a part of the bundled inorganic fibers are in contact with other inorganic fibers, and an elongation direction of a contact portion between the part of the bundled inorganic fibers and the other inorganic fibers has a component in a direction of a thickness of the at least one sheet.

6. The refrigerator of claim 1, wherein an average length of the plurality of inorganic fibers is in the range of 15 to 50 mm.

7. The refrigerator of claim 1, wherein an average diameter of the plurality of inorganic fibers is in the range of 3 to 8 µm.

8. The refrigerator of claim 1, wherein an average value of weights of the sheet per unit area for each sheet before being enclosed in the enveloping member is in the range of 10 to 200 g/m$^2$.

9. The refrigerator of claim 1, wherein at least a part of the inorganic fibers from among the one or more sheets enclosed in the enveloping member has a partially-curved shape.

10. The refrigerator of claim 1, wherein a direction having a larger tensile strength between a first direction and a second direction perpendicular to the first direction in a plane direction of the one or more sheets is set to be a longitudinal direction of the vacuum insulator.

11. The refrigerator of claim 1, wherein the plurality of inorganic fibers comprise one type selected from the group consisting of glass fibers, ceramic fibers, rock wool, basalt fibers, silica alumina fibers, silica fibers, and alumina fibers, or a mixture of two or more types thereof.

12. The refrigerator of claim 1, wherein the plurality of inorganic fibers comprise $SiO_2$ in the range of 50 to 60 weight percent, CaO in the range of 15 to 25 weight percent, MgO in the range of 0 to 6 weight percent, $Al_2O_3$ in the range of 12 to 16 weight percent, $B_2O_3$ in the range of 8 to 13 weight percent, $K_2O$ in the range of 0 to 1 weight percent, and $Na_2O$ in the range of 0 to 1 weight percent (however, the sum of the content of $SiO_2$, CaO, MgO, $Al_2O_3$, $B_2O_3$, $K_2O$, and $Na_2O$ is 100 weight percent or less).

13. The refrigerator of claim 1, wherein the plurality of inorganic fibers are glass fibers fabricated by a continuous filament method.

14. The refrigerator of claim 1, wherein the glass fibers are formed of E glass.

15. The refrigerator of claim 1, wherein the core member includes a plurality of stacked sheets.

16. A vacuum insulator comprising:
a sack-shaped enveloping member having a gas barrier property; and
a core member enclosed in the enveloping member, the core member including one or more sheets, each including a plurality of inorganic fibers,
wherein an inside of the enveloping member is decompressed, and
wherein at least one sheet of the one or more sheets comprises a plurality of bundled inorganic fibers formed by bundling some inorganic fibers from among the plurality of inorganic fibers, and at least a part of the bundled inorganic fibers are in contact with each other, and
wherein the at least one sheet comprises in the range of 10 to 200 bundled inorganic fibers per 1 cm3.

17. The vacuum insulator of claim 16, wherein the core member includes a plurality of stacked sheets.

18. A refrigerator comprising:
an outer case;
an inner case accommodated in the outer case to receive cooling air to cool an inside of the inner case; and
a vacuum insulator disposed between the outer case and the inner case,
wherein the vacuum insulator includes:
   an enveloping member having a gas barrier property; and
   a core member enclosed in the enveloping member and including at least one sheet having bundled inorganic fibers, and
wherein a width of each of the bundled inorganic fibers is in the range of 0.1 to 2.0 mm, and a length of each of the bundled inorganic fibers is in the range of 10 to 100 mm.

* * * * *

UNITED STATES PATENT AND TRADEMARK OFFICE
CERTIFICATE OF CORRECTION

| | | |
|---|---|---|
| PATENT NO. | : 10,137,658 B2 | Page 1 of 1 |
| APPLICATION NO. | : 15/039684 | |
| DATED | : November 27, 2018 | |
| INVENTOR(S) | : Toshimitsu Tsuruga et al. | |

It is certified that error appears in the above-identified patent and that said Letters Patent is hereby corrected as shown below:

In the Claims

Column 22, Line 39:
In Claim 16, after "decompressed," delete "and".

Signed and Sealed this
Twenty-ninth Day of January, 2019

Andrei Iancu
*Director of the United States Patent and Trademark Office*